US007734562B1

(12) United States Patent
Hairman

(10) Patent No.: US 7,734,562 B1
(45) Date of Patent: Jun. 8, 2010

(54) VOICE TO TEXT CONVERSION WITH KEYWORD PARSE AND MATCH TO SEMANTIC AND TRANSACTIONAL CONCEPTS STORED IN A BRAIN POOL STATE MACHINE USING WORD DISTANCE TO GENERATE CHARACTER MODEL INTERACTION IN A PLURALITY OF DRAMATIC MODES

(75) Inventor: Robert Hairman, Los Angeles, CA (US)

(73) Assignee: Brainpool, Inc., Los Angeles, CA (US)

( * ) Notice: Subject to any disclaimer, the term of this patent is extended or adjusted under 35 U.S.C. 154(b) by 493 days.

(21) Appl. No.: 11/612,999

(22) Filed: Dec. 19, 2006

Related U.S. Application Data

(60) Provisional application No. 60/766,114, filed on Dec. 30, 2005.

(51) Int. Cl.
G06F 17/10 (2006.01)
G06F 17/20 (2006.01)
G06F 17/27 (2006.01)
G06N 7/08 (2006.01)
G10L 15/02 (2006.01)
G10L 15/14 (2006.01)
G10L 15/26 (2006.01)

(52) U.S. Cl. .............. 706/55; 706/20; 704/250; 704/251

(58) Field of Classification Search .............. 706/55
See application file for complete search history.

(56) References Cited

U.S. PATENT DOCUMENTS 6,031,549 A 2/2000 Hayes-Roth

OTHER PUBLICATIONS

Choi et al., Concept-Based Image Retrieval Using the New Semantic Similarity Measurement, 2003.*
Agular, A Dynamic Fuzzy-Cognitive-Map Approach Based on Random Neural Networks, 2003.*

* cited by examiner

*Primary Examiner*—David R Vincent
*Assistant Examiner*—Nathan H Brown, Jr.
(74) *Attorney, Agent, or Firm*—Aka Chan LLP

(57) ABSTRACT

A system and method is disclosed that supervises the behavior of interactive characters using dynamic, fuzzy, social rules. These characters, called Protags, resemble human beings and are modeled after universal characters and story motifs. Protags respond to input from speech recognizers, text based natural language recognition systems and manipulation of objects in the virtual world in which these characters reside.

11 Claims, 6 Drawing Sheets

VOICE TO TEXT CONVERSION WITH KEYWORD PARSE AND MATCH TO SEMANTIC AND TRANSACTIONAL CONCEPTS STORED IN A BRAIN POOL STATE MACHINE USING WORD DISTANCE TO GENERATE CHARACTER MODEL INTERACTION IN A PLURALITY OF DRAMATIC MODES

CROSS-REFERENCE TO RELATED APPLICATION

This patent application claims the benefit of U.S. provisional application 60/766,114, filed Dec. 30, 2005, which is incorporated by reference along with any other references cited in this application.

BACKGROUND OF THE INVENTION

The present invention relates generally to the fields of Interactive Characters and social interaction, and in particular to a system for creating and supervising the behavior of these characters.

In 1966, Joseph Weizenbaum at the Massachusetts Institute of Technology, Cambridge, Mass., developed Eliza, a program which made natural language conversation with a computer. Eliza did this using a relatively simple process.

The benefits of interactive characters are substantial. Interactive characters have increased comprehension by eighty-two percent and by ninety percent when accompanied by bulleted text summaries.

Sixty-four percent of users prefer receiving information from interactive characters, as opposed to text or audio. As an example, "click-through" rates for an electronic advertisement increased by 700 percent when an electronic character was used. The use of interactive characters results in substantial cost savings; for example, with just one customer service application, a corporation realized a multimillion dollar cost benefit.

Simultaneous to the development of interactive characters, videogames, training simulations and educational applications have made great strides since 1990. The graphic quality of games such as Everquest or World of Warcraft approaches that of film. Character movement is sophisticated and fluid.

Techniques, that until recently needed countless hours of rendering, can be displayed in real-time. As a result, virtual worlds look polished and interactive characters can do many human things; walk, run, jump, dance, fight, plot their own paths between locations, and avoid obstacles in the virtual world.

Additionally, speech recognition technology achieves high recognition rates, the modeling of human speech for recognition systems, has also allowed character lip-synch to be easily automated.

Consider the state of movies in the early twentieth century: Actors used broad gestures derived from the theater, and narrative was limited to visual interactions with occasional subtitles. Though the medium was immensely popular, the moment Al Jolson spoke and sang in The Jazz Singer, silent films quickly went extinct.

Despite the advances in graphic animation quality, characters' interactions with humans and character-to-character interaction remain crude and awkward. In current interactive entertainments like The Sims, or Grand Theft Auto, character interaction with other characters or players is limited in the same way early film was limited: Gestures are broad and overstated and characters speak in cartoon bubbles. Story development is marginal, often consisting of levels, which boast different scenery, but similar action.

Similarly, training simulations and e-learning applications suffer from the limitation of not addressing the verbal nature of human interactions, despite the fact that the majority of human interactions are verbal.

For the last ten years the primary developments in interactive entertainment have involved interactive characters in virtual worlds. For the most part, these characters represent a similar level of development to film in 1926.

Therefore, there is a need for a system and method of supervising the behavior of interactive characters using dynamic, fuzzy, and social rules.

BRIEF SUMMARY OF THE INVENTION

A system and method is disclosed that supervises the behavior of interactive characters using dynamic, fuzzy, social rules. These characters, called Protags, resemble human beings and are modeled after universal characters and story motifs. Protags respond to input from speech recognizers, text based natural language recognition systems and manipulation of objects in the virtual world in which these characters reside.

In interactive applications of Protagonist, human beings are considered by the program as identical to the computer driven characters. Consequently you play by the same rules. In addition to human input Protag behavior is influenced by timeline constraints and a modal system called D-Modes. Protagonist contains a database of character behavior allowing Protags to act appropriately in a wide variety of situations, along an extended timeline.

In an embodiment of Protagonist, these rules represent a story generation mechanism, which draws from a database of character behavior allowing characters to act appropriately through an extended timeline with a human or another Protag. In this configuration, Protagonist can be seen as a computer-based environment resembling a movie studio, populated by versatile actors, proficient in verbal, physical and acting skills.

In the early days of theater, actors were called Players. Given a basic plot they would reenact traditional stories. They had freedom to improvise, but often used standard tricks and tested routines. These were not written, but handed down from clown to clown, actor to actor, Player to Player. Despite this, the rules of performance were well defined, but fuzzy, there was a great deal of latitude in what a Player could do, as long as he advanced the story to its required resolution.

In a similar way, Protagonist can generate continuous action, enabling the creation of a new generation of video games, educational applications, and animated entertainment. These applications are capable of continuous play with rare repetition. Each interaction with a Protag is a unique performance by the Protag, who, in turn, compels a human to perform.

A movie is a simulation of a sequence of events taking place in human-centric reality. Similarly, Protagonist simulates human reality by integrating rules specifying type of events that are likely to occur along a timeline, in a finite social situation.

You, the human, are the Protagonist. The story revolves around you. And no one knows how it will turn out. Protagonist can generate continuous dramatic action. Each interaction with a Protag is a unique performance by the Protag, who, in turn, compels the player to perform.

Protags respond to input from speech recognizers, text based natural language recognition systems, and manipulation of objects in the virtual world. In interactive applications, a human player plays by similar rules to the computer driven characters.

Protags draw from an extensive library of behaviors, consisting of physical actions, Semantic Behavior programs called D-modes, dialog clips, and underscore.

As in a movie, confronting an interactive criminal may lead to violence, negotiation or confession, while an interview with a Zen master can offer valuable insight into your situation.

Despite the relative sophistication of the above games and characters, they fall far short of true interactivity. By combining an original approach to interactive character behavior and story development, with methods used in recently developed interactive character software and videogames, Protagonist addresses many of the shortcomings of current interactive characters, simulations and videogames.

For Protagonist to take interactive character software to a more refined level it is necessary to pose and answer the questions: What is the innate structure of a storyHow do you simulate an authentic training simulationWhat drives actors in movies to act the way they do? What is the most efficient way to produce authentic and entertaining interactive characters that can engage in extended goal-driven interactions?

Ergo: Protagonist!

Protagonist is a spoken word driven, interactive character system, supervised by a set of social rules that nondeterministically directs the action.

In an embodiment Protagonist will allow people to experience a story, rather than watching it, and so will help usher in a new medium, video games with the sophistication of movies. A new era of both interactive entertainment and linear animation. You are the Protagonist. The story develops as a result of your actions.

The advantages of Protagonist can be realized across many multibillion dollar industries, including videogames, training-simulation, corporate training, customer service, education, and advertising, whether delivered through a disc, the Internet, or your cell phone.

Videogames are the fastest-growing area of the entertainment market. Characters are our culture's choices as representatives. A simulation trumps a description. When it is accompanied by a Protag, its value increases exponentially.

Various aspects of Protagonist include: A unique database of story motifs that allows for the reenactment of millions of possible stories. Combining situational plot fragments with a statistical timeline to contribute to animated character actions. Animated characters that regard humans as the protagonist in a drama and behave appropriately to advance a plot. Characters that behave in a way appropriate to generate continuous dramatic action. Using fuzzy story construction rules to control the behavior of interactive characters. Combining statistical NL with a continuous state machine to make decisions about the actions of a dramatic character simulated by a computer. Compilation of animation data into a language of dramatic action derived from popular media motifs. Using a fuzzy modal system to simulate the process of acting. Using a database of tagged Concepts to stimulate the actions and utterances of an animated character.

Other objects, features, and advantages of the present invention will become apparent upon consideration of the following detailed description and the accompanying drawings, in which like reference designations represent like features throughout the figures.

DETAILED DESCRIPTION OF THE INVENTION

An embodiment of the invention is known as Protagonist. Protagonist may be implemented as software executed using a computer system.

Figure 1:
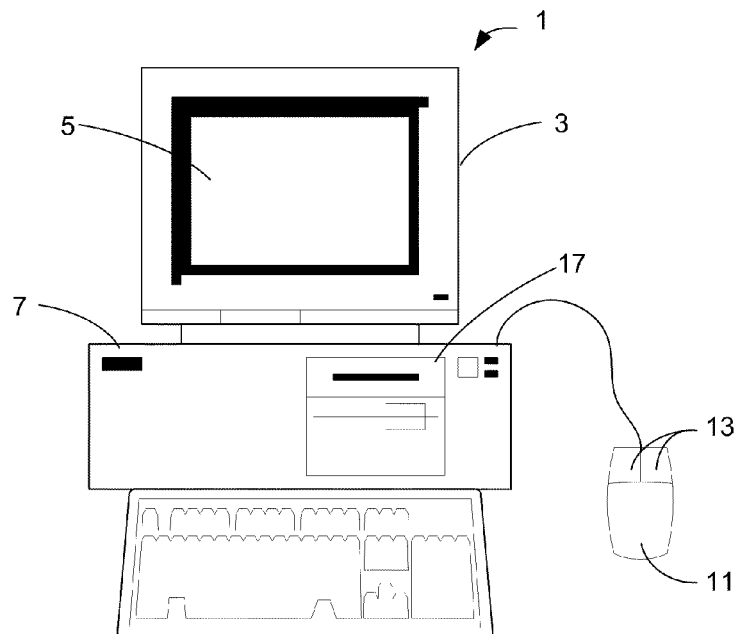
FIG. 1 shows a system of the present invention to implement interactive characters of the invention.

FIG. 1 shows a system of the present invention. In an embodiment, the invention is software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor, memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
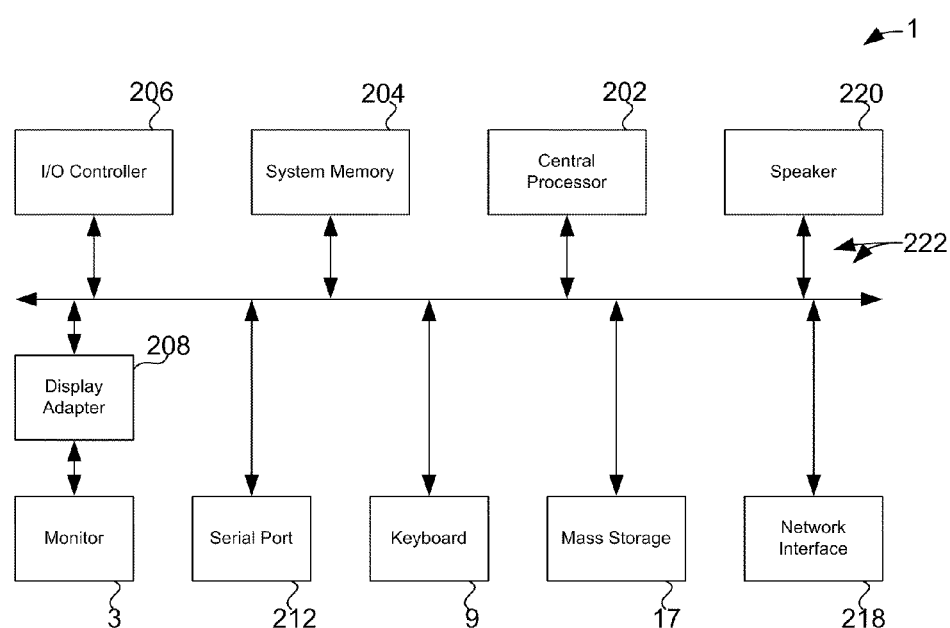
FIG. 2 shows a simplified system block diagram of a computer system used to execute software of the invention.
Figure 3:
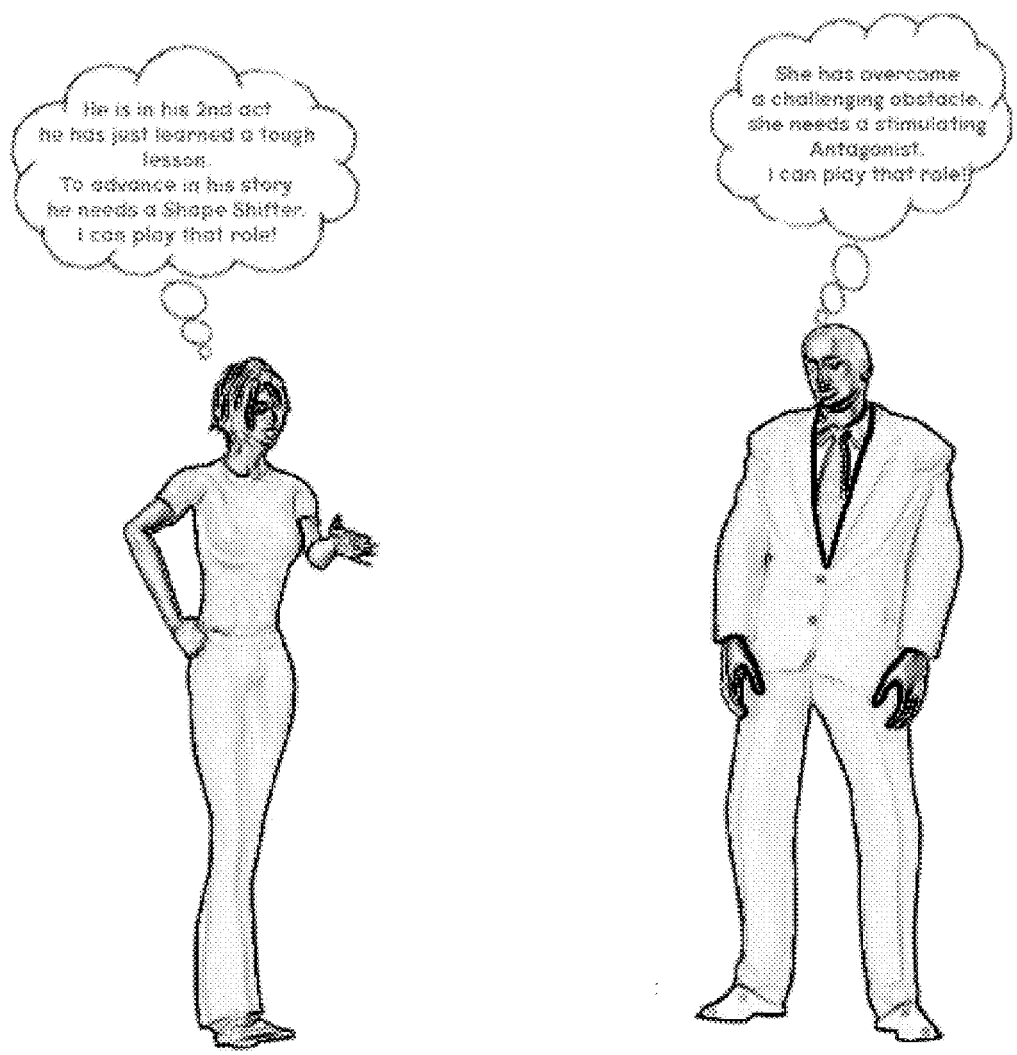
FIG. 3 shows how characters examine each others state and play the role the other, or a human, needs to move ahead in its story, or simulation.
Figure 4:
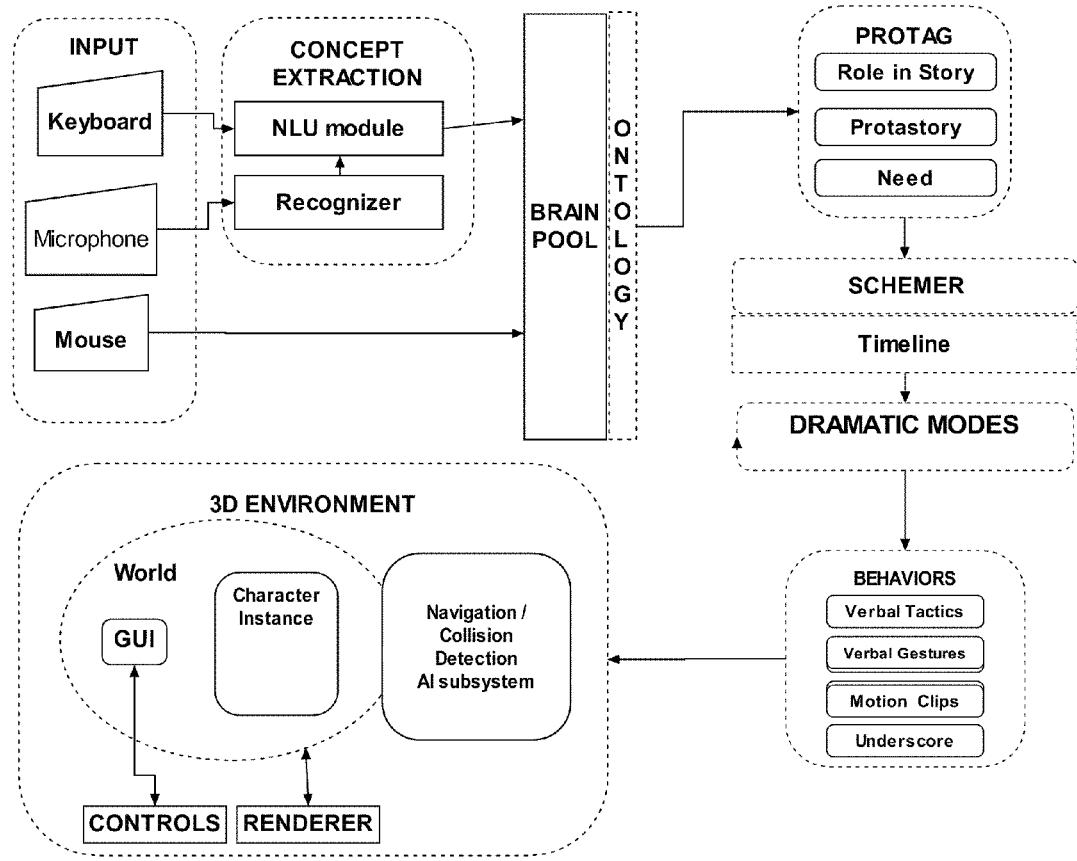
FIG. 4 shows a data flow. If the interface is speech the recognizer passes tokens to the NLU (Natural Language Understanding) module. The NLU searches for keywords in the Dictionary, and matches combinations of keywords to Concepts in the BrainPool, using distance between words as a factor. Typed input goes directly to the NLU module and follows the same path from there to the BrainPool. GUI input, similarly, influences concepts in the BrainPool. The BrainPool consults the Current State of the Protag and excite the likeliest D-Modes, influencing the likelihood of them occurring. The current D-Mode responds according to its game plan, picking appropriate actions, semantic gestures, underscore and application specific dialogue. Finally the Protag acts in the 3D environment, taking collision detection and navigation subsystem rules into account.
Figure 5:
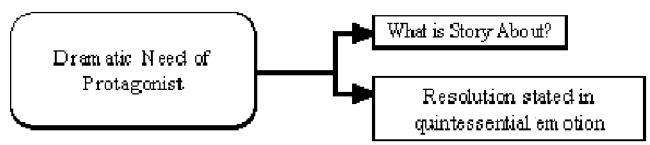
FIG. 5 shows how the need of the Protag drives the application.
Figure 6:
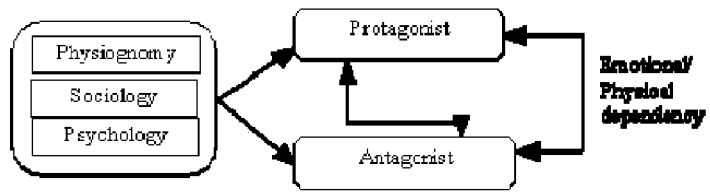
FIG. 6 shows the lock between Protag and antagonist.
Figure 7:
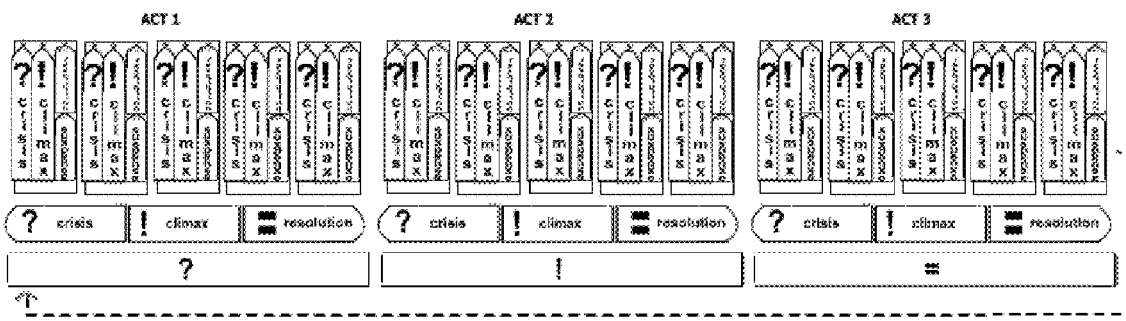
FIG. 7 shows the three act structure in an embodiment of Protagonist.
Figure 8:
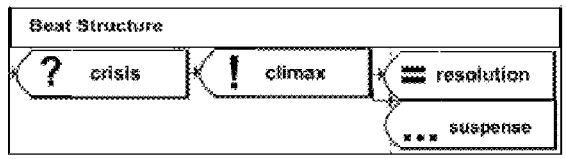
FIG. 8 shows a structure of a beat, a basic unit of time in Protagonist.
Figures 9, 10:
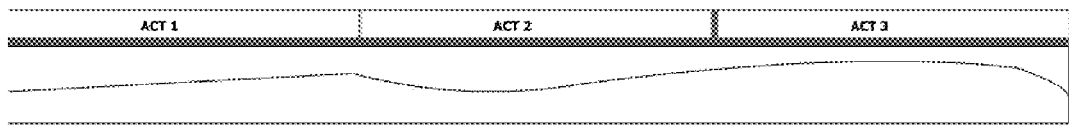
FIG. 9 shows a scene type and distribution. The scene types may occur in the positions below. They slide back and forth along the timeline based on aggregated factors.
FIG. 10 shows how the tension level rises and falls through a narrative cycle.
Figure 11:
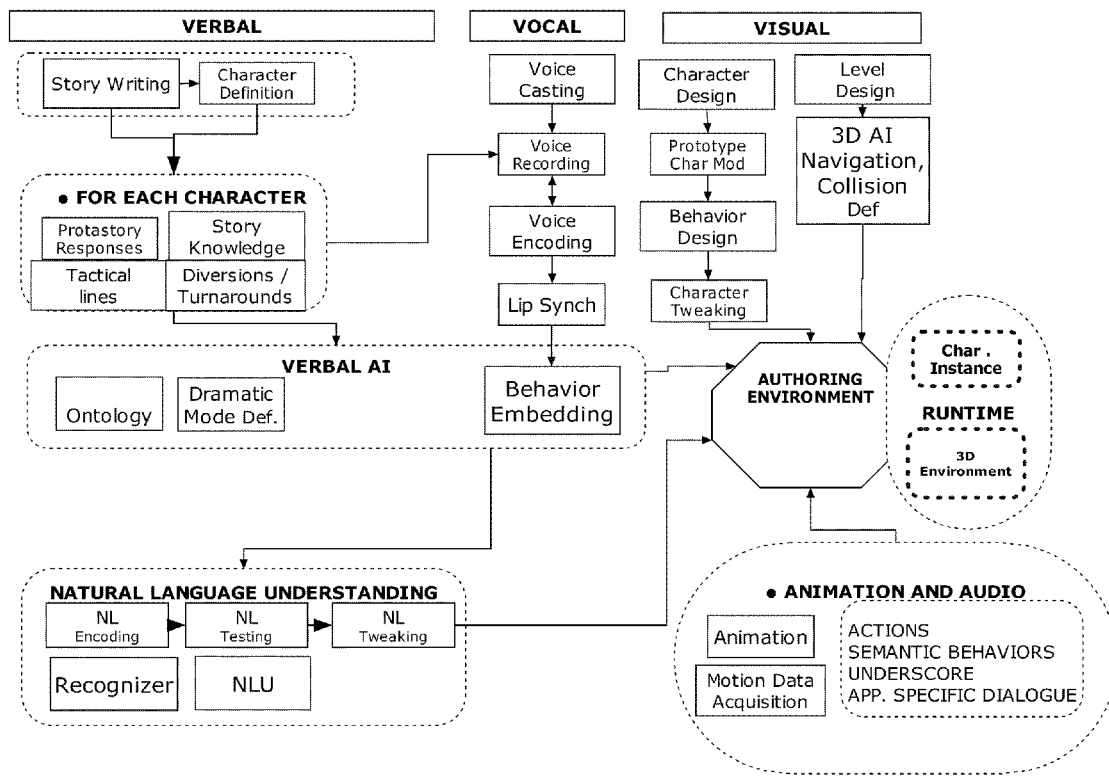
FIG. 11 shows a Protagonist production and asset development process.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems. For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11i, and 802.11n, just to name a few examples). For example, signals from a computer may be transferred, at least in part, wirelessly to components or other computers.

System Summary

Protagonist uses speech recognition input or typed text, or commands from buttons within a virtual world. The resulting text string is passed to a pattern matcher that matches key words to semantic Concepts using word distance.

These Concepts reside in The Brain Pool, a vector-based continuous state machine (or network). Each concept is present in a Protags current state at all times, though at varying level of stimulation. At differing levels of stimulation thus has some likelihood of occurring, however low.

There are the major types of Concept in the brain pool. The Timeline, Protags, and D-Modes. D-Modes are unspoken rules (or assumptions) that underlie most exchanges. Using D-Modes a character emulates acting methodology in which subtextual information is communicated to advance a story along a timeline.

The Timeline is a fuzzy dramatic event sequencer and a database of event types that advance the situation of a Protag or Player. The Timeline. It influences what D-Mode a Protag will go into at a particular moment. Each Timeline Event encourages or discourages the likelihood of particular D-Modes occurring.

The Generic Protag is an unconfigured Protag. Configuring requires setting the likelihood of the Protag going into D-Modes.

Each concept is tagged at design time, with instructions to raise or decrease the likelihood of a D-Mode occurring. This simulates how a character reacts dramatically to what the player, or another character says or does.

Input from the user is recognized by stimulating D-Modes—raising or decreasing the likelihood of a Protag going into that D-Mode.

If unstimulated the likelihood of a D-Mode manifesting decays over time (that D-Mode is less likely to activate in the character).

A D-Mode is a goal directed procedure employed by a Protag to achieve a goal like "Help the player advance along a dramatic timeline." Or, "Advance along my own timeline." For example, in a Mentoring D-Mode a Protag might provide the Player necessary information or give him a clue. In other words a D-Mode is a type of dramatic interaction that has a similar form to the action by a character in a movie, though the time base is different.

A D-Mode has Setup Tactics, Confrontation tactics, and resolution tactics.

Dialogue and Action Generation. A method for picking and concatenating physical behaviors, verbal behaviors, and UnderScore. D-Modes use rules to govern which behaviors to sequence. These rules are organized as a semantic database drawn from studies of dramatic media.

The D-Mode weighs these factors and spits out a list of behaviors.

Protags act out a scenario which combines verbal and physical behavior to communicate meaning—a wave, a wink, a nod, a puppy dog head tilt, handshakes, and so on Accompanying these physical behaviors are verbal exclamations ("Oh my God"), emotive expressions ("Excuse me!"), jokes, bluffs, and B.S.—all which are used by the Protag when called upon.

Characters can navigate virtual worlds, fight, or compete with other characters and simulate sports. Three-dimensional computer games are more than fifteen years old and are more spectacular than ever. But they remain mute. Autistic. Verbal interaction is nonexistent which cuts out most of the human drama. Unable to act. Games are already structured like stories, but now non player characters need to learn to interact with all the skills of dramatic actors.

Whereas prior art games have a distinctly limited set of possibilities, Protagonist has millions—it is a unique database of story motifs that allow for millions of possible stories. Protagonist, combined with motion synthesizers will break through these limitations.

Protagonist advances on this idea—making the player the center of the action. Also Facade is really one story. Protagonist will generate multiple simultaneous stories. Protags play dramatic roles to advance the player along a dramatic timeline. Protags act with a range of strategic behaviors.

Further, an aspect of the invention is tagging of output files to influence the behavior of an interactive character. Another aspect is vector-based continuous state machines to emulate a dramatic timeline.

Operation

Protagonist has four major parts, described below:

(1) Protag, the generic character.

(2) Schemer, the supervisor of the timeline.

(3) D-Modes, nondeterministic behavioral routines.

(4) A library of physical and vocal behaviors.

Protag, The Generic Character

Characters in Protagonist are embodiments of a generic, mutable character.

Authors alter the physical characteristics of each Protag in a development environment. Integrated software provides a parametric character, using morphing to create alternative faces, bodies and phonemes. To this end, an identified software development kit will be integrated into the Authoring Environment. Authors control the design of a face using sliders and adjusting parameters such as age, ethnicity and gender, as well as the more conventional parameters. Authors also specify the personality of the Protag by mapping the likelihood of her/him going into each D-Mode.

Protags share behavior from a database of motion data derived from animation, generated motion and motion capture systems, plus generic and application specific audio clips. Generic audio includes UnderScore loops and dialog. A Protag (human or nonhuman) is the Protagonist of its own dramatic timeline.

Protag's peer into each others CurrentState and invoke the likeliest D-Mode, to enable the other character or player to advance in their Timeline.

In each stage of the timeline, the Protag has a set of D-Modes available to it. These are mapped to the Current State of the Protag and the SceneType.

A Protag's behavior is stimulated by Input from players, the position he/she is occupies in the timeline and current D-Mode. The Protag's behavior in turn stimulates other humans or Protags.

A high-priority factor in the decision of which mode a Protag goes into is what the human's timeline calls for. If a human's timeline needs an antagonist, the Protag assembles a list of D-Modes it can use to foil the human's attempts to progress toward the fulfillment of his driving need. Alternatively, if called, a Protag can play an Ally or a Mentor.

Dramatic Need: The motivating force of a Protag is called a Need. The fulfillment of this need is what motivates the Protag through the story. This Need can be psychological, moral or physical. For example, a former mercenary might help a group of prostitutes avenge the killing of their sisters because he needs forgiveness for past behavior. Or it could be a simple as James Bond needing to stop Dr. No from world domination.

If a human picks a driving need and the human's timeline calls for an antagonist, or agent of the antagonist, the Protag will adopt an antagonistic bias to its D-Modes. An emotional dependency develops between a Protag and his/her antagonist. Though the progress of a human through the time is rich and varied, it is ultimately a contest, for similar goals, between these two. As a side-effect of the above rule, Protagonist is a viable platform for any simulation of a contest between humans.

Dependency between Protagonist and Antagonist: In a dramatic embodiment of Protagonist an emotional lock exists between a Protagonist and his/her antagonist. The Protag and the Antag compete. Within Protagonist the antagonist picks representatives from available characters who provide obstacles to the Protags advance.

If a Protag plays antagonist to a human, the Protag emulates the human's skills.

Protostory—A Protag has among its generic responses, personal information, and back-story. Called the Protastory, this includes clips recorded during Authoring, and maintained as responses to generic topics that occur frequently in everyday conversations. Testing reveals that 250 concepts cover the most common topics for a Protag to attain suspension of disbelief. Along with this is a Natural Language Understanding module and Ontology that allows the Protag to address these topics. The Protastory is invoked by D-Modes. Depending on the settings of the current D-Mode, all, none, or part of this history might be available to the human.

Brain Pool

The basic mechanism of Protagonist is the BrainPool, a network of continuous states. It can be imagined as an opaque glass filled with carbonated water. Each bubble in the water has an excitement level. Excited bubbles rise. Bubbles that are not stimulated lose their excitement and sink toward the bottom. Though each bubble always has a level of excitement we only see bubbles at the top of the glass, because the glass is opaque. Stimulation of the bubbles comes from three sources: (1) A Human, (2) the Schemer, and (3) the D-Mode.

This is expressed as a number on a scale of 0-10—where 0 is a binary off (no relationship) and 10 is a binary on, (completely dependent) and the numbers in between reflect the degree of the relationship. An element, (SceneType, D-Modes, and TimelineSlot) is related to other elements by similar numbers. For example, there are the SceneType, Approach, and others.

Timeline

In an embodiment of Protagonist, the Timeline is a nonchronological, three acts or five acts, cyclical timeline, composed of a Beats, grouped into sequences, which are, in turn, grouped into acts. Acknowledging that video game sequences tend to be substantially longer than those in movies are, each act has five Sequences. Each Sequence includes however many Beats the character uses to resolve to the next slot in the timeline. The timeline is cyclical, allowing continuous play. When one story ends, another begins.

The Beat: A Beat is the basic unit of action. Like everything else in the timeline, it includes a Conflict, a Crisis, and a Resolution or a Suspended Resolution (resolved later in the timeline).

Sequence Types: In an embodiment of Protagonist, each slot in the timeline has a dramatic purpose. Each Sequence Type has a premapped, greater-or-lesser likelihood of occurring at different stages in the Timeline. Each SceneType has a similarly specified relationship to every D-Mode, suggesting the likelihood of that D-Mode occurring in that slot. These are not fixed positions. The BrainPool picks the most likely SceneType to fill an available slot. So, while it is unlikely that an Ordeal occurs in Act 1, it is possible. Similarly, it is extremely unlikely that an IncitingIncident will occur in Act 3.

Tension Level The timeline also has a tension level. The likelihood of any D-Modes appearing at any stage of the timeline takes this into account. This tension level reflects the emotional arc of a Protag, in dramatic iterations, or the progress of a student in e-learning simulation iterations.

Unresolved Resolutions Protagonist keeps track of unresolved resolutions or tests and attempts to resolve them later on the Timeline.

D-Modes

The Protag's behavior is governed by D-Modes. A D-Mode, short for Dramatic Mode, describes unspoken rules (assumptions) that underlie most exchanges. In each of these modes a Protag will pick the likeliest behavior allowed in that mode, at this stage of the Timeline.

The likelihood of a D-Mode occurring rises or falls in the BrainPool stimulated by input tags (embedded within Behaviors) and constrained by the timeline.

The D-Mode, GreetingACloseFriend, is far likelier to occur in Act 1 than Act 3. The scene sequencer considers the question; what will advance the character towards his goals?

In one respect, a D-Mode is similar to an improvisation by a comedian. Comedians are given a basic premise; strive to get what they want out of an interaction, picking from available comedic behaviors and obeying fuzzy rules.

An obvious example is an interrogation, which has both implicit and explicit rules. The explicit rules are represented by the limits imposed by policy and law. The implicit rules are the balance between friendliness and aggression that an interrogator maintains to obtain information. The likelihood of the Interrogator asking questions is high, (it might be a ten, which is the Protagonist version of a binary switch).

These questions will probably be about "The Story" (In Scoop, the story is the definitive version of what happened to all relevant characters.) The likelihood of the interrogator invoking his Aggressive Mode is fifty-fifty. If the likelihood of the Protag or human answering direct questions is low, the likelihood of aggression rises.

In Interrogation Mode a Protag acts similarly, though in a nondeterministic way, picking behavior that will help it achieve the goal of getting specific nuggets of information. If Interrogation mode fails to achieve its goal, it will likely pass the task on to another mode with similar goals, like Wheedling Mode, or Seducing Mode.

D-Modes ensure compelling interaction between humans and Protags.

Other explicit examples are evident in the world of film. In Natural Born Killers, Mallory, one of the Protagonists, steals a quarter from the tip jar and sashays through a diner to put a coin in a jukebox. Mallory's dramatic mode in this Beat is Sexual Competitiveness with the Waitress who is flirting with her maniacal boyfriend. The way she walks conveys this directly to the audience while her dialogue is an inane discussion of the Waitress' name. Her Tension Level is high, so we know the scene is likely to spill over into violence. Her dialog is Cutting Sarcasm from her Generic Expression library.

Each D-Mode is mapped at Design time to every behavior. (1-10). It is possible, if unlikely, for every Protag to use any of the behaviors in the Library.

D-Modes are nondeterministic methods of developing a story. As in the examples above, a Protag enters a scene to play a part that has potential to go numerous ways, depending on what the human says or does.

D-Mode Parameters

Goal: A D-Mode is an attempt by a Protag to achieve a goal using verbal and physical behavior.

Volatility: The Protags temper. A low Volatility suggests an even-tempered Protag.

Persistence: How many Beats Protag remains in this mode.

Pace: How quickly Protag gets to the point.

Tension: The dramatic tension level.

Entrance: How the Protag transitions to this mode.

Exit: How the Protag leaves this mode

Resolution: Whether this mode needs the Beat to be resolved, before exiting.

Story Point: Whether to reveal or conceal a plot point.

Dialog Flow Multithreaded topics—each beat must be resolved at some point in the Timeline.

Allegiance: A D-Mode has within it two submodes; Ally and antagonist. A Protag switches between these, depending on humans need. At run time, a Protag can take either or both sides (e.g., in Shapeshifter mode) of a contest.

History: In each D-Mode, Authors specify whether the Protags history is available, and if so, for how many Beats.

Behaviors

Below D-Modes in the hierarchy are Behaviors. Behaviors can contain a physical movement, an UnderScore element, and or a gesture or verbal expression.

Actions: The ability to walk, run, jump, sit, prepare a drink, and chew gum will be available to every Protag. These actions are collections of grouped motion data, plus the collision detection and navigation intelligence to perform actions. For example, to prepare a drink a Protag needs to walk to a bar, take a glass from a shelf, place it on a counter and so on. Each stage of this action will be in the database along with at least one thousand actions, enabling a Protag to successfully function in the virtual world. Commercially available motion libraries supplement production.

Semantic Behaviors Protags will employ Semantic Behaviors—actions, which communicate meaning; a wave, a wink, a nod, a puppy-dog-head tilt, handshakes, and so on. Using previous research, a library of more than 500 semantic behaviors has been described and will be implemented in Protags. Accompanying these physical behaviors are verbal exclamations ("Oh my God!"), emotive expressions. ("Excuse me!"), and many other repeatable behaviors.

At design-time, Semantic Behaviors are inserted into a Dialog Transcript and combined with automatic lip-synch to produce realistic facial animation. At run time, these characters draw on them, achieving realistic and expressive performances.

UnderScore: Behavior also includes musical underscoring, that is themes likely to accompany behaviors. These are mapped to D-Modes.

Application Specific Dialog: For each application of Protagonist, writers write and actors record, story specific dialog and Narration.

Schemer

The plot is set of facts that underlie a story. In Protagonist, the Schemer is a machine that ensures that the human moves continuously through his timeline. The Schemer includes application specific paradigms for embodiments. The human seeks a goal expressed as his Need. The Schemer plots and schemes to keep the plot moving appropriately, employing a set of rules governing timeline transitions. It keeps track of a human's timeline and can force resolution of beats, by introducing a story point.

In one embodiment of Protagonist, the system collects plots into generic groups, which can be used as automated iterations or as frameworks for Author-driven-content. At design time, templates describing plot progress are written. When the timeline calls for a Story Point, the Schemer provides the next story point in the plot, or its closest relative.

Plots are mapped to each other in the same manner as everything else in Protagonist—a scale of 0-10 describes the distance plots relationships.

A plot is a device to keep a story moving, even if, as in Hitchcock's McGuffin, it does not resolve. A D-Mode may call for a story point. Physical action in pursuit of a plot is more entertaining than the simple exchange of information. In many cases, progress is scored by how much of the plot a human has uncovered.

Bring Action to Human—No matter where in the virtual world a human might be, Protagonist will provide dramatically appropriate action. Action is freed from being tied to location. In effect, Protags assist a human to move through the Timeline.

Speech Generation—Protagonist uses limited domain speech synthesis, a form where domain-relevant speech fragments are concatenated at the behest of the D-Mode.

Virtual World—Protagonist will use state-of-the-art virtual technology including renderers, physics modules, and collision detection methods.

Development Platform—Protagonist is a data driven system. To lighten the burden of production, protagonist will include numerous automated methods of development. Most important of these is the generic Protag, which can become any imaginable Protag, and can share its data with other Protag. Protagonist Studios will create a development environment that will allow the smooth creation of all elements described in this document.

As mentioned above, embedding semantic behaviors in a Protags script reduces animation time exponentially.

Operation

In E-learning simulation embodiments of Protagonist, the timeline has a similar structure to the above. However, crisis, conflict, resolution, is replaced by lecturing, fielding questions and testing. Here, the Protag is dramatically motivated to seek goals, like "student passes exam." The Protag will pick behaviors that advance the student a long the timeline, in this the course.

Special D-Modes are included in Protagonist to accommodate the E-learning market. Just like narrative modes, E-learning interactions will be classed as D-Modes, with three distinct stages; Lecturing, Fielding Questions, Evaluating performance.

Teachers, Police or other government officials, sportsmen and gangsters each have identifiable, though fuzzy, behavioral procedures that fit into a dramatic framework. A dramatic narrative can be considered a simulation of a process in the real world. Each presentation or argument a teacher makes, when attempting to embed the rules underlying nature into the mind of a student is a D-Mode. A behavioral protocol translated into dynamic rules operating on a non-chronological timeline.

CONCLUSION

The evolution of computers and the internet enabled the development of large-scale virtual worlds inhabited by numerous avatars of human beings, and minimally intelligent computer based characters. Protagonist addresses the need to make these characters behave more like intelligent humans who can speak, understand and adhere loosely to a narrative or social paradigm, like humans do.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer-implemented method comprising:
   at a computer, receiving conversational voice input from a user;
   with a processor of the computer, converting the conversational voice input to a text string;
   parsing the text string representation of the received input;
   providing in the computer a repository of key words;
   matching patterns in the text string to key words to semantic and transactional concepts using word distance, wherein the concepts reside in a brain pool state machine, implemented using computer code executing on the computer, the computer code residing on a mass storage device of the computer; and
   providing an interaction output, via a computer monitor and speaker coupled to the computer, to the user based on the brain pool state machine.

2. The method of claim 1 wherein the concepts residing in the brain pool state machine comprise a timeline, Protags, and D-modes, stored on the mass storage device of the computer.

3. The method of claim 2 wherein a D-mode has factors comprising strategies and tactics, stored on the mass storage device of the computer.

4. A computer-implemented method of creating an interactive character comprising:
   at a computer, receiving a conversational voice input from a user;
   with a processor of the computer, converting the conversational voice input to a text string;
   parsing the text string representation of the received input;
   matching patterns in the text string to key words to semantic concepts using word distance according to a character model for the interactive character;
   implementing in the character model a plurality of dramatic modes, wherein each dramatic mode has a parameter specifying when that dramatic mode is in effect for a certain time period in a timeline of a story;
   when the story is in a first time period, selecting a first dramatic mode where the conversational voice input from a user has a first percentage chance of invoking a mode change of the character;

when the story is in a second time period after the first time period, selecting a second dramatic mode where the conversational voice input from a user has a second percentage chance of invoking the mode change of the character, wherein the second percentage chance is greater than the first percentage chance; and outputting to a display screen and speaker of the computer a representation of the character being in the changed mode in the first time period when the first percentage chance is exceeded and in the second time period when the second percentage chance is exceeded.

5. The method of claim 4 comprising:

when a predetermined amount of time has elapsed in the story and the user has not gained an additional story point during the elapsed time, causing the protagonist to lead the user from one location in a map of the story to another location in the map of the story.

6. The method of claim 4 comprising:

implementing a semantic behavior response in the character wherein in response to the conversational voice input, outputting to the display screen of the computer a representation of the character have a different facial expression than what was previously displayed.

7. The method of claim 4 comprising:

implementing a semantic behavior response in the character wherein in response to the conversational voice input, outputting to the speaker of the computer a representation of the character having a verbal exclamation.

8. The method of claim 4 comprising:

implementing a semantic behavior response in the character wherein in response to the conversational voice input, outputting to the display screen of the computer a representation of the character moving from one location in the story to another location in the story.

9. The method of claim 4 wherein the character model comprises dramatic modes for goal, volatility, persistence, pace, tension, entrance, exit, resolution, story point, dialog low, allegiance, and history.

10. The method of claim 9 wherein each dramatic mode can be assigned a value from 0 to 10.

11. The method of claim 4 wherein the dramatic mode is an aggressive mode.

* * * * *